United States Patent [19]

Flink

[11] 4,234,781
[45] Nov. 18, 1980

[54] METHOD AND ARRANGEMENT FOR HEAT-WELDING TOGETHER TWO TUBULAR ELEMENTS

[76] Inventor: Birger Flink, Porsvägen 4 B, S-752 46 Upsala, Sweden

[21] Appl. No.: 962,877

[22] Filed: Nov. 22, 1978

[30] Foreign Application Priority Data

Dec. 19, 1977 [SE] Sweden ............................ 7714441

[51] Int. Cl.³ .................... H05B 3/06; F16L 47/02
[52] U.S. Cl. .................... 219/243; 219/10.53; 285/382.7; 285/DIG. 10; 156/423; 156/380; 156/272; 277/138
[58] Field of Search .............. 219/10.53, 10.49, 8.5, 219/9.5, 10.41, 10.57, 10.75, 10.81, 10.73, 10.79, 243, 535, 520, 522; 156/158, 293, 294, 296, 423, 499, 502, 503, 272–275, 380; 285/21, 423, 382.7, 381, DIG. 10; 277/138, 155

[56] References Cited

U.S. PATENT DOCUMENTS

| | | | |
|---|---|---|---|
| 2,459,720 | 1/1949 | Poltorak | 285/DIG. 10 |
| 2,739,829 | 3/1956 | Pedlow et al. | 219/10.53 |
| 3,061,503 | 10/1962 | Gould et al. | 219/243 |
| 3,080,183 | 3/1963 | Luertzing et al. | 285/DIG. 10 |
| 3,315,986 | 4/1967 | Quick | 285/21 |
| 3,360,631 | 12/1967 | Hess | 219/535 |
| 3,382,121 | 5/1968 | Sherlock | 285/381 |
| 3,539,411 | 11/1970 | Heslop et al. | 285/DIG. 10 |
| 3,975,039 | 8/1976 | Penneck et al. | 285/DIG. 10 |
| 3,990,661 | 11/1976 | De Groef | 285/381 |
| 4,070,044 | 1/1978 | Carrow | 285/DIG. 10 X |

FOREIGN PATENT DOCUMENTS

928911 6/1963 United Kingdom ............ 285/DIG. 10
1434069 4/1976 United Kingdom ............ 285/DIG. 10

*Primary Examiner*—B. A. Reynolds
*Assistant Examiner*—Philip H. Leung
*Attorney, Agent, or Firm*—Kinzer, Plyer, Dorn & McEachran

[57] ABSTRACT

A method of joining together by heat welding two tubular elements of a meltable thermoplastic material. The elements are arranged so that one tubular element receives one end of the other element in a telescoping manner to form an annular space between the two elements. A welding sleeve of a meltable thermoplastic material is positioned in the annular space between the two tubular elements. Heating elements are also arranged in the annular space for heating and welding the welding sleeve to the surfaces of the two tubular elements. Additionally, a ring-shaped body which becomes enlarged when heat is applied thereto is positioned in the annular space between the two tubular elements and the heating elements are arranged on the outer surface of the ring-shaped body. The two tubular elements and the welding sleeve are pressed together by the force exerted by the ring-shaped body whose material shape is changed from a state in which it is originally dimensionally stable in heat to a state in which it is dimensionally unstable in heat.

2 Claims, 3 Drawing Figures

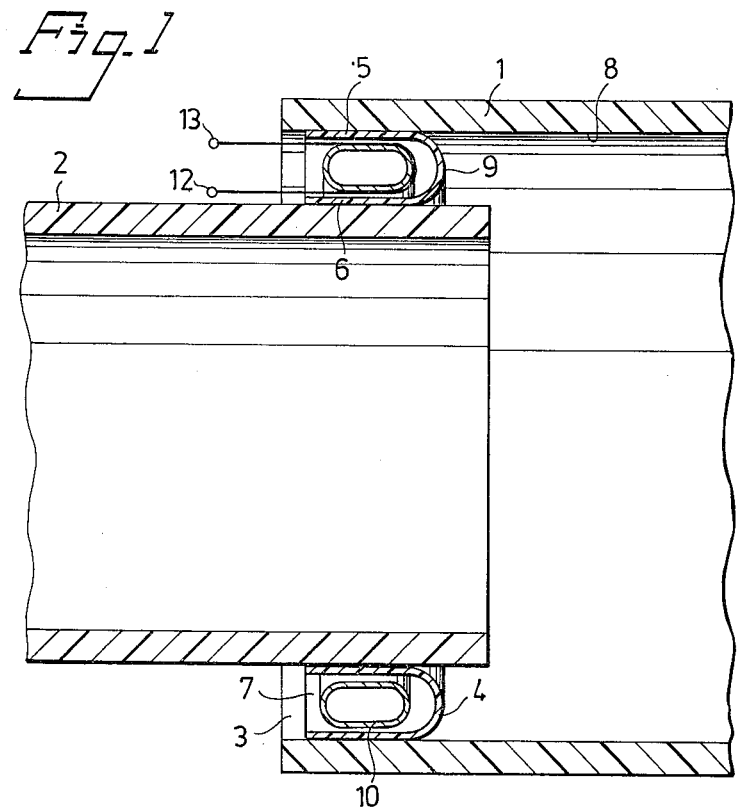
Fig. 1
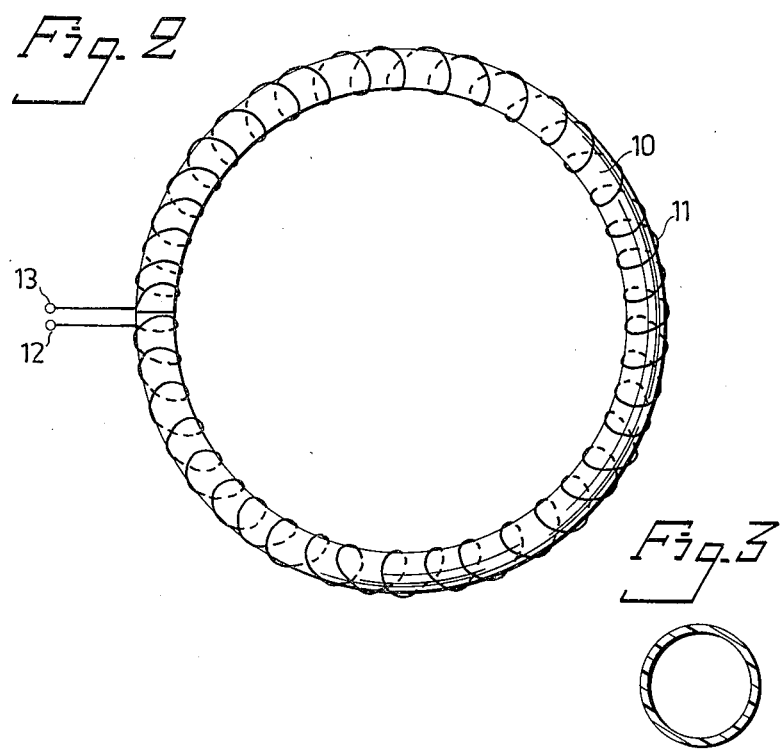
Fig. 2
Fig. 3

METHOD AND ARRANGEMENT FOR HEAT-WELDING TOGETHER TWO TUBULAR ELEMENTS

The present invention relates to a method of joining together by heat-welding two tubular elements made of a meltable thermoplastics material, in which one of said tubular elements is adapted to receive one end of the other of said elements to form an annular space for receiving a welding-sleeve made of a meltable thermoplastics material, and in which a heating means is arranged in said annular space for heating and welding the sleeve to the surfaces of the tubular elements facing said sleeve, and in which the force exerted by a plastics element whose material condition is changed from an original state in which it is dimensionally stable in heat to a state in which it is dimensionally unstable in heat is used to press the two tubular elements and the sleeve together. The invention also relates to an arrangement for carrying out the method.

It is known to use tubular elements, for example connecting sleeves, which have a widened portion for receiving the end of a tube which, similar to the sleeve, is made of a weldable thermoplastics material, the widened portion being stretched while heated and then permitted to cool in the widened state. In this way there is obtained a so-called memory effect of the plastics material, which when re-heated returns to its original, non-expanded state and presses the molten welding-sleeve against the tubular element lying therewithin with a pressure which provides a force-absorbing and liquid-tight welding seam.

The use of this welding technique, however, is limited to tubes of small dimensions, since the welding sleeve placed therewithin and the heating means therefor must be capable of transmitting sufficient heat to the sleeve for it to shrink and melt to the requisite extent. This limitation is conditioned by the large amounts of heat which must be transmitted to even relatively small sleeves, which means that heat must be applied over relatively long periods. Attempts at supplying large quantities of heat per unit of time, in order to reduce the time over which heat must be applied, normally results in burning of the plastic material and in carbonization of parts of the material which impairs the tightness of the joints. Another disadvantage is that the weld becomes completely rigid, and movements between the two tubular elements welded together cause the formation of cracks, and therewith leakages.

The known method cannot be used with pipes of very large diameters, for example pipes used in remote-controlled heating systems and having diameters of 800 mm.

A prime object of the invention is therefore to provide a method and an arrangement with which the aforementioned problems are completely overcome.

This prime object is realised by the method and the arrangement defined in the accompanying claims.

So that the invention will be more readily understood and further features thereof made apparent, an examplary embodiment of the invention will be described with reference to the accompanying schematic drawing, in which:

FIG. 1 is an axial sectional view through two tubular elements which are to be welded together by means of an arrangement according to the invention, FIG. 2 is a simplified view of the pressure-generating means, and FIG. 3 is a sectional view of the means shown in FIG. 2 subsequent to applying heat to said means and permitting it to expand freely.

In FIG. 1 there is shown a cylindrical, tubular element 1 made of a weldable thermoplastics material, for example an non-cross linked polyethene. The tube 1 may comprise a sleeve which is to be welded to a tube or pipe 2 made of a weldable thermoplastic material. The diameter of the tube 1 is larger than that of the tube 2, thereby to form an annular space 3 between the ends of the respective tubes. Inserted in the space 3 is a welding sleeve 4. In the FIG. 1 embodiment the sleeve 4 comprises a U-shaped strip of material which can be melted by applying heat thereto, for example a non-cross-linked polyethene. The strip has been folded double so as to obtain two legs 5, 6 which between them define a space 7. One of the legs, 5, of the strip 4, which strip extends around the whole of the annular space 3, abuts the inner surface 8 of the tube 1, while the other leg 6 abuts the outer surface of the tube 2.

It will be understood that when the two legs 5, 6 are brought to a molten state and when at least the co-acting surfaces of the tubes are brought to a molten state, the two tubes 1, 2 will be joined to each other through a sealing wall 9. The plastics from which the welding sleeve 4 is made will be as elastic as possible in order that any relative movement, radially and/or axially, between the two tubes 1, 2 can be taken up by the wall 9.

A pressure and heat generating means is arranged in the space 7 to provide for the requisite melting and pressure-welding of the sleeve 4, at least within the region of the abutment with the two tubes 1, 2. In the illustrated embodiment, said means comprises an at least substantially closed ring 10 comprising a tube which originally has a substantially circular cross-sectional area as shown in FIG. 3. This tube which comprises a cross-linked or non-cross-linked plastics, for example a polyethylene, has been deformed in a manner well known so as to obtain an approximately elliptical cross-sectional shape, as shown in FIG. 1. The tube, which is originally of circular cross-sectional shape, can be deformed by heating the tube in a deformed state and then permitting the tube to cool whilst maintaining the deforming pressure thereagainst. When the thus deformed tube is heated, the material will return to its original shape, i.e. circular cross-sectional shape, as a result of its so-called memory effect.

In the illustrated embodiment, the area of the ring 10 has been flattened to an extent such that the welding sleeve and the ring can readily be inserted into the space 3. To provide for the melting of the aforementioned sleeve portions which abut the two tubes 1, 2, and to ensure that sufficient heat is passed to the ring 10, the ring is wound with a heating filament 11 having free connector ends 12, 13, as illustrated schematically in FIG. 2, for connecting the filament to a voltage source. The filament 11 should be wound loosely enough to permit the ring to change its cross-sectional shape without risk of the filament breaking.

The ring 10 is relatively well heat-insulated in the space 7 and has a relatively small mass, and hence melting of the weld-portions of the sleeve 4 and heating of the ring 10 to the extend required in order for the ring to resume its original shape takes place quickly with a relatively small energy consumption. As soon as the ring 10 begins to return to its original shape, the legs 5 and 6 of the weld sleeve 4 will press against the tubes 1, 2, to provide a tight weld which is capable of taking up movements between the thus welded tubes.

The pressure-generating means need not have the form of a tube, but may well comprise a solid rod having, for example, a square cross-sectional shape in its original, heat-stable state, the rod subsequently being deformed by flattening the rod in its heat-unstable state.

Heat may also be supplied to the welding sleeve, in order to melt the same, and to the pressure means inductively, in which case, for example, a metal foil is placed between the pressure means and the welding sleeve. The welding sleeve may also have the form of a hose arranged to surround the pressure means. The hose may be formed directly on the pressure means in the form of a coating of desired thickness.

When a cross-linking of plastics material is desired in the weld region between the welding sleeve and the tube 1 and between the welding sleeve and the tube 2 respectively, the welding tube may, for example, be impregnated with a peroxide which provides the desired bridge building when the material from which the welding sleeve is made melts.

I claim:

1. A system of joining together by heat-welding two tubular elements of thermoplastic material and of mutually different diameters, subsequent to inserting one end of one said element into one end of the other to leave an annular gap therebetween, said system comprising:
    (a) a ring-shaped welding sleeve which is located in said gap and which is made of a meltable thermoplastic material,
    (b) a recoverably deformed pressure-generating ring-shaped body made of a heat-recoverable plastic material inserted within the welding sleeve,
    (c) heat-generating means arranged to cooperate with said ring-shaped body in a manner such as to heat the same and to bring the welding sleeve and said mutually opposing wall surfaces to a fusible state.

2. A system according to claim 1, in which the heat-recoverable body is a hollow annular element having heating filaments wound around the wall thereof and being pre-deformed to exhibit a part-flattened configuration in cross-section through said wall.

* * * * *